No. 705,162. Patented July 22, 1902.
C. N. TROOIEN.
ANIMAL POKE.
(Application filed Dec. 31, 1901.)
(No Model.)
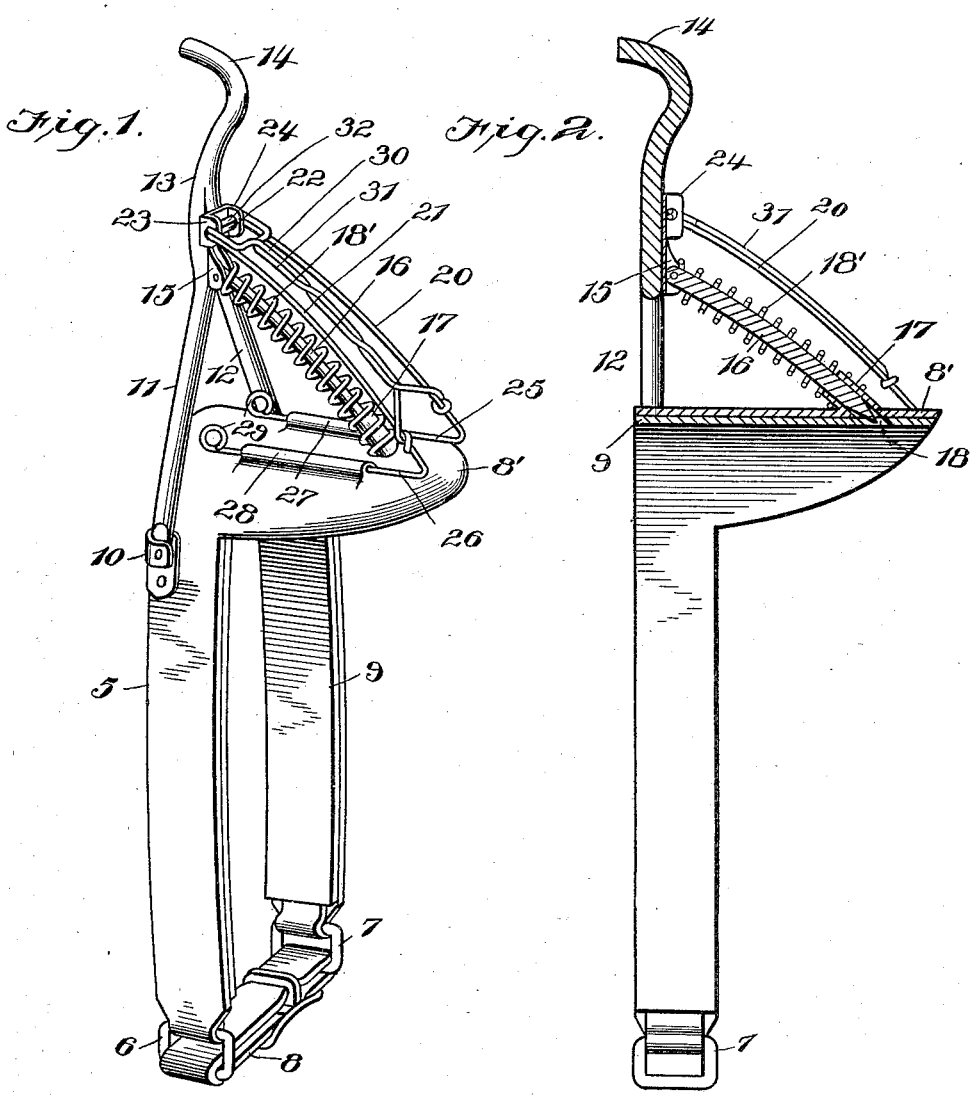

UNITED STATES PATENT OFFICE.

CORNELIUS N. TROOIEN, OF HENDRICKS, MINNESOTA.

ANIMAL-POKE.

SPECIFICATION forming part of Letters Patent No. 705,162, dated July 22, 1902.

Application filed December 31, 1901. Serial No. 87,928. (No model.)

*To all whom it may concern:*

Be it known that I, CORNELIUS N. TROOIEN, a citizen of the United States, residing at Hendricks, in the county of Lincoln, State of Minnesota, have invented certain new and useful Improvements in Animal-Pokes; and I do hereby declare the following to be a full, clear, and exact description of the invention, such as will enable others skilled in the art to which it appertains to make and use the same.

This invention relates to animal-pokes; and it has for its object to provide a device of this nature which may be secured about the neck of an animal and having such construction that should the animal attempt to go through a fence the poke will be operated to prick the neck of the animal, and thus induce him to desist in his attempts.

A further object of the invention is to provide a construction wherein the parts will be efficient in their operation and will be protected against damage in their operation, other objects and advantages of the invention being understood from the following description.

In the drawings forming a portion of this specification, and in which like numerals of reference indicate similar parts in the several views, Figure 1 is a top perspective view of the poke. Fig. 2 is a vertical section taken through the needle.

Referring now to the drawings, the present animal-poke comprises the metallic U-shaped collar 5, which is open at the bottom to facilitate application and removal and at the ends of which are the loops 6 and 7, through which is engaged the retaining-strap 8 for holding the sides of the collar against outward displacement and consequent displacement of the device. At the upper side of the collar is the semi-elliptical rearwardly-directed plate 8', which may be secured to or formed integral with the remaining metallic portion of the collar, and the entire collar is provided with a leather or other suitable lining 9 to prevent undue chafing of the neck of the animal. Upon the sides of the collar are secured the ears 10, or they may be formed integral therewith, and pivoted to the ears are the ends of the members 11 and 12 of a bifurcated lever 13, the upper end of which extends above the collar and terminates in a forwardly-directed hook 14. Upon the lever 13 are the ears 15 at the point of bifurcation of the lever, and between these ears is pivoted one end of a needle 16, which is pointed at its opposite end and passed through the tubular guide 17, secured upon the upper face of the plate 8' and leading to the perforation 18 in the plate, the pointed end of the needle being adapted to project through the perforation and below the plate to penetrate the skin of the neck of the animal when the upper end of the lever is moved rearwardly. To hold the lever normally and yieldably in its forward position and to return it to such position when released after being moved rearwardly, a helical spring 18' is disposed to encircle the needle and bears with its ends against the plate 8' and the ears upon the lever, respectively, the end of the spring encircling the tubular guide 17. With this construction it will be seen that if an animal attempts to go through a fence the upper end of the lever will engage the fence and will press the needle through the plate 8' and into the neck of the animal, and as soon as pressure upon the lever is stopped the spring will force the lever back to withdraw the needle.

To protect the needle and its spring, a guard is provided and consists of the spaced members 20 and 21, having the connecting-web 22, which web is engaged pivotally through the perforations of spaced ears 23 and 24 upon the lever, just above the point of connection of the needle. The free ends of the members 20 and 21 are bent at right angles to lie parallel, and the resultant end portions 25 and 26 are engaged slidably with tubular guides 27 and 28 upon the top of the plate 8'. The ends of the members are bent to form rings 29 to prevent withdrawal thereof through the tubular guides. A second pair of members 30 and 31 are also provided, having a connecting-web 32, which is also engaged through the ears 23 and 24, said members being twisted together and having their extremities connected to the members 20 and 21. These members 20, 21, 30, and 31 prevent contact of the spring with a wire of a fence through which the upper end of the lever may be passed.

In practice modifications of the specific construction shown may be made, and any suitable materials and proportions may be used for the various parts without departing from the spirit of the invention.

What is claimed is—

1. An animal-poke comprising a collar having a rearwardly-directed plate, a lever pivoted to the collar, a needle pivoted to the lever and passed rearwardly and downwardly through the plate, means for holding the lever yieldably with the needle retracted, and a guard connected to the lever and slidably connected with the plate, said guard extending above the needle.

2. An animal-poke comprising a collar having a rearwardly-directed portion, a bifurcated lever having its bifurcations pivoted to opposite sides of the collar, a needle pivoted to the lever and passed through the extension of the collar, a helical spring disposed upon the needle and bearing with its ends against the lever and the extension of the collar, respectively, and a guard disposed to protect the spring and needle, said guard being pivoted at one end to the lever and being slidably connected with the collar at its opposite end.

3. An animal-poke comprising a collar having a rearwardly-directed portion having a perforation therethrough and having parallel guides at opposite sides of the perforation, a lever pivoted to the collar, a needle pivoted to the lever and slidably engaged with the perforation, means for holding the needle normally retracted, and a guard attached to the lever above the needle and having its ends slidably engaged with the guides to permit of movement of the lever to project the needle through the perforation.

In testimony whereof I affix my signature in presence of two witnesses.

CORNELIUS N. TROOIEN.

Witnesses:
SAM S. FRAILAND,
INGEBRET A. ROGNES.